Nov. 9, 1948.  G. L. DIMMICK  2,453,502
SOUND-TO-IMAGE TRANSDUCING SYSTEM
Filed May 11, 1944
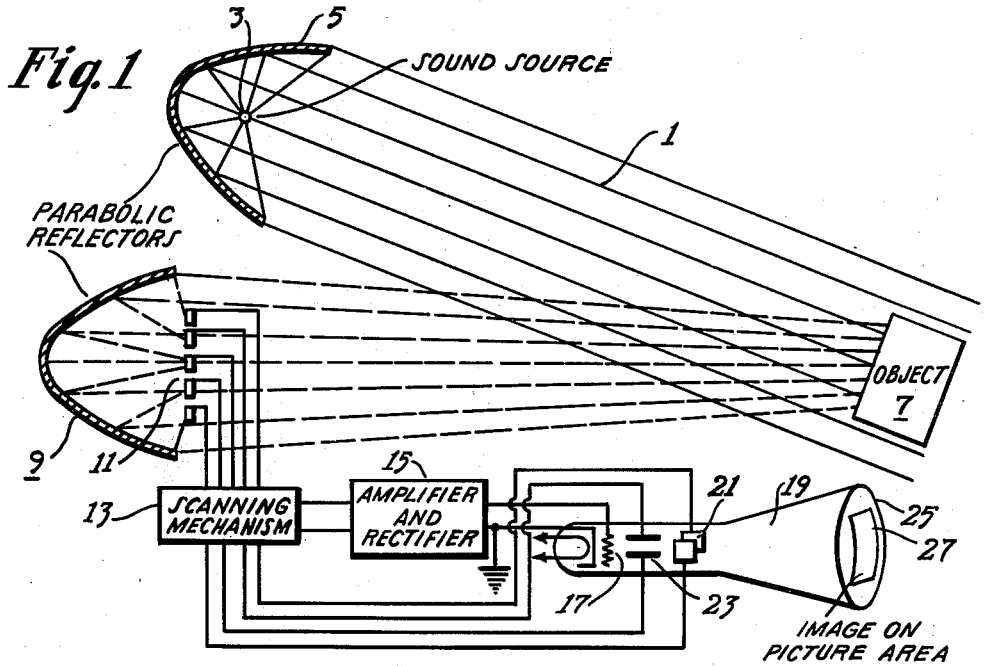
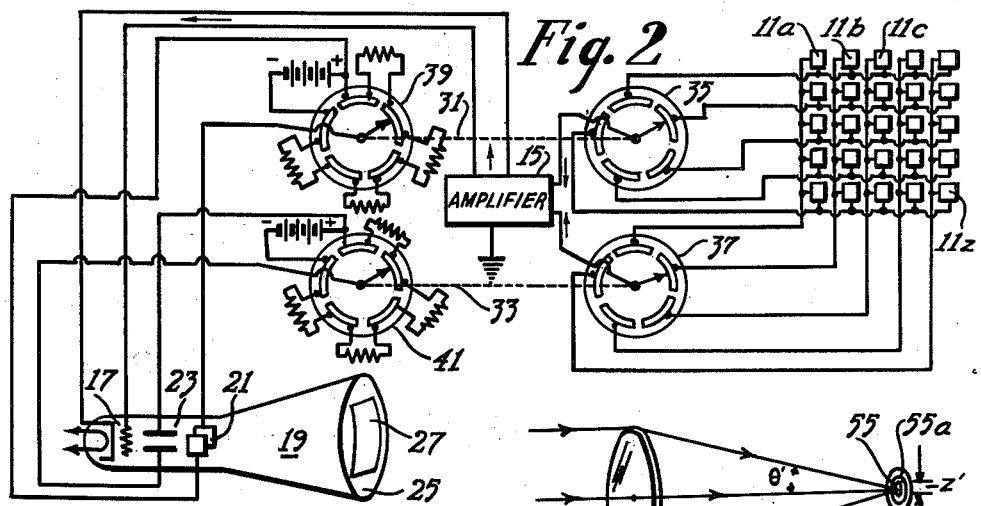
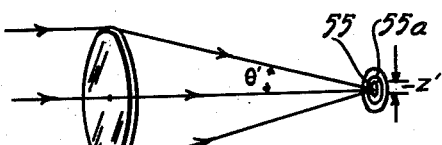
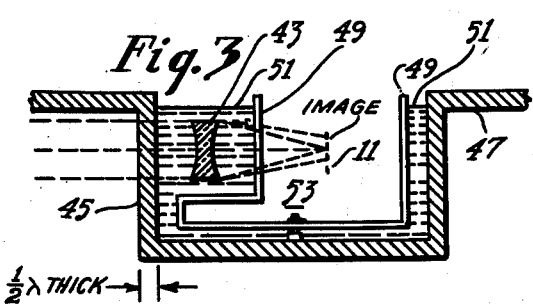
INVENTOR.
Glenn L. Dimmick
BY
ATTORNEY

Patented Nov. 9, 1948

2,453,502

UNITED STATES PATENT OFFICE 2,453,502

SOUND-TO-IMAGE TRANSDUCING SYSTEM

Glenn L. Dimmick, Indianapolis, Ind., assignor to Radio Corporation of America, a corporation of Delaware Application May 11, 1944, Serial No. 535,111

6 Claims. (Cl. 178—6.8)

This invention relates to the art of ascertaining the pattern and structure of a remote object by means of reflected compressional waves and has for its principal purpose to provide an improved method of and means for converting such reflected waves into an intelligible optical image of an obscured body.

It is well known that the presence and indeed the location of an object immersed in an obfuscating medium such as water, fog or smoke can be detected by means of sonic or ultrasonic vibrations reflected from the object. Further, it has heretofore been proposed to convert reflected air-borne ultrasonic vibrations into a visible image of a remote object by focusing the said airborne vibrations upon a bank of illuminated, but masked, diaphragms which, when actuated by the said vibrations, reflect the light rays beyond the masks to a nearby screen.

One very real disadvantage of present day "sound-to-image" transducing systems of the general character above described is that their optical equipment (lamps, lenses, masks, vibrating mirrors, etc.) renders them entirely unsuited for under-water signaling. Further, such apparatus is cumbersome and difficult to adjust, especially when mounted upon an unstable platform such, for example, as a deck of a ship.

Accordingly, another and important object of the present invention is to provide an improved and simplified sound-to-image transducing system, and one which lends itself readily to underwater signaling.

Other objects and advantages together with certain preferred details of construction will be apparent and the invention itself will be best understood by reference to the accompanying drawing wherein:

Figure 1 is a partly diagrammatic view of an electrical transducing system constructed and arranged in accordance with the principle of the invention, Figure 2 is a circuit diagram of a receiving apparatus of receiving or transducing apparatus, Figure 3 is a sectional view of an alternative means for collecting and focusing the reflected wave pattern upon a mosaic of sound sensitive electrical transducers and Figure 4 is a sketch illustrative of a modified form of pick-up device within the invention.

In the embodiment of the invention shown schematically in Fig. 1, compression waves 1 from a source 3 are projected either through water or through the air by means of a parabolic reflector 5 upon the object 7, to be viewed. These waves 1, which are preferably of an ultrasonic frequency, are modified by and reflected from the object 7 and are picked up either by the same or by another parabolic reflector 9 which focuses the reflected waves upon a mosaic 11 made up of from, say, twenty-five to one hundred and forty-four or more sound responsive electrical transducers 11a, 11b, etc., such, for example, as piezo-electric crystal units, magnetostrictive tubes, or capacitive type microphones. The several transducers or vibratile elements 11a, 11b, etc., of which the mosaic 11 is comprised operate to convert the collected compressional waves into a multiplicity of discrete electric currents or signals of an intensity proportional to the intensity of said waves at the particular point in the reflected wave pattern at which the individual mosaic elements are mounted.

A scanning mechanism indicated generally at 13 connects each of these receiving units 11a, 11b, etc., in turn to an amplifier-rectifier 15 and then to the control grid 17 of a cathode ray Kinescope 19. Voltages which are controlled by the scanning mechanism are applied to the vertical and horizontal plates 21, 23 respectively, of the cathode ray tube 19 and cause the electron beam therein to scan the screen 25 in proper synchronism to form an image 27 of the object 7. In the event that a single parabolic reflector is employed both for transmitting and picking up the ultrasonic waves, a suitable switching mechanism (not shown) may be provided intermediate the said reflector and the scanning mechanism for providing appropriate transmitting and receiving intervals.

The scanning may be done in various ways. Thus, a mechanical system may be used if the number of picture elements is of the order of say 100, and if about one-tenth of a second is used for one scanning. A 25-element picture has been assumed in Fig. 2 for the purpose of illustrating one suitable form of mechanical scanner. In this drawing, the two shafts 31 and 33 are so coupled together that one shaft (the lower one, 33) rotates at five times the speed of the other. If one scanning excursion is to be complete in 0.1 second, then the shaft 33 is driven at 50 revolutions per second. The two terminals of each microphone in the mosaic 11 are connected to the commutators 35 and 37 respectively, in the manner shown in the drawing. As the shafts 31 and 33 rotate, each microphone element 11a, 11b, etc., is connected to the amplifier 15 in proper sequence. The two potentiometers 39 and 41 at the left of Fig. 2 are on the same shafts as the corresponding scanners and supply the necessary voltages for the horizontal and vertical plates 20 and 21 of the cathode ray Kinescope tube 19.

It is not fundamentally necessary that a scanning system be employed. Thus, if each of the microphone elements 11a–11z is connected through an amplifier to a correspondingly located source of light, the brightness of which is made proportional to the intensity of the vibrations picked-up by the said individual elements, a punctiform or half-tone optical image will be formed. The scanning system, however, makes it possible to dispense with the necessity for employing a large number of amplifiers.

The parabolic reflector 9 shown in Fig. 1 for focusing the reflected wave pattern upon the bank or mosaic 11 of microphone cells can be replaced, if desired, by a refracting lens. Such a lens is shown at 43 in Fig. 3. This lens 43 can be made of a material in which the velocity of sound is either higher or lower than it is in the surrounding medium. (The relative index of refraction of the lens material is equal to the ratio of the velocity of waves transmitted through it, to the velocity of said waves in the surrounding medium.) In this case the mosaic 11 for converting the compressional waves into electric signals need not be immersed in water but may be mounted, by way of example, in a cylindrical enclosure 45 which extends downward from the bottom of the ship, 47. The enclosure 45 is preferably made of steel and has a thickness equal to ½λ of the sound waves in steel. When made of this thickness, the steel plate 46 becomes transparent to the particular frequency employed, provided the plate has the same medium on both sides. To accomplish this a rotatable turret 49 constituted of thin metal is placed inside the enclosure 45 and the space between it and the enclosure wall is filled with water, as indicated at 51. The lens 43 is mounted in the contained water 51 and the image which it produces from the reflected wave pattern is formed in the air 53 in the unfilled part of the turret. The principal advantage of this arrangement is the air has a high index of refraction (i. e. lower velocity) than water. As a result, the wave length of the sound of the compressional-wave pattern is much shorter than it is in water and the resolution is higher. (This corresponds to the increased resolving power which results from the use of an oil immersion microscope objective.)

The lens 43 shown in Fig. 3 has the shape of a "negative" lens, although it converges the compressional waves. This is so because the velocity of such waves in most solid materials is greater than it is in water. If the velocity of the waves in the material of the lens is lower than the velocity in water, then the shape of the lens would be convex instead of concave.

Because of the large differences in impedance between water, metal and air, the problem of sound reflection at the lens and at the boundary between air and metal is important. It is therefore proposed to reduce this reflection in the same way that surface reflection from glass is reduced, i. e. by coating the lens with a layer or layers of material of the proper thickness and of a suitable index of refraction. In other words, the interference principle may be employed to eliminate or reduce reflections to a minimum. Thus, the boundary surface of the lens 43 may be etched to reduce reflections in much the same way as it is done in the case of glass. The indentations or pores in the surface of the lens must, in this case, be of small dimensions as compared to the wave length of the compressional waves.

Diffraction phenomena sets the limit to the detail which can be obtained in the "sound image." In this connection, referring now to Fig. 4, it will be recalled that if a point source is placed a long distance from the lens, the resulting image will consist of a center disk 55 surrounded by rings of decreasing intensity 55a etc. This is described quite adequately on pages 128–131 of "The Principles of Optics" by A. C. Hardy and F. H. Perrin (Fig. 4 is a copy of Fig. 59, on page 128 of the above reference) as follows:

$$Z' = \frac{0.61\lambda}{n' \tan \theta'}$$

where, Z' is the radius of the central disk and also the separation of two points in the image which can just be resolved.

$$\frac{\lambda}{n'}$$

is the wavelength in the image space which has an index of refraction of $n'$. It is therefore apparent that the resolving power is directly proportional to the index of refraction in the image space and to the frequency of the sound wave.

If a section of the center of the reflector 9 or lens is removed, the resolving power of the remaining "ring" 55a is considerably improved. This added resolving power is obtained at the expense of contrast. But the contrast can be again restored in the electrical circuit by giving the amplifier a non-linear amplitude characteristic. In this way the contrast may be made variable so that a picture may be adjusted to give the most satisfactory quality under a given set of conditions.

If the hole in center of the reflector has a diameter equal to one-third of the outside diameter of the reflector, the resolving power is at least twice that calculated from the above formula. The table shown below shows how the resolving power of such a ring reflector varies with the frequency of the sound and the diameter of the reflector.

TABLE

*Separation in inches of two image points which are just resolved*

| Frequency of Sound | 24″ dia. Reflector | 36″ dia. Reflector | 48″ dia. Reflector |
|---|---|---|---|
|  | Inches | Inches | Inches |
| 20,000 | 1.72 | 1.15 | .86 |
| 40,000 | .86 | .57 | .43 |
| 60,000 | .57 | .38 | .28 |

A submarine is approximately 300 ft. in length, and it is certainly necessary to see it when it is a mile away. If a submarine at this distance should occupy three picture elements, the element spacing would have to be .46″, the focal length of the lens or reflector being assumed to be 24″. Referring to the foregoing table, it is seen that the frequency required would be 50,000 cycles per second with a 36″ diameter lens or about 38,000 cycles/sec. and a 48″ diameter.

It will now be apparent that the present invention provides an improved method and means for ascertaining the pattern and structure of a remote object by means of reflected compressional waves, and one which lends itself readily to underwater signaling.

What is claimed is:

1. Apparatus for ascertaining the structure of an object in water comprising a source of compressional waves in the sonic or ultrasonic range adapted to be immersed in water, means for projecting waves from said source upon said object whereby the intensity of said waves will be modified and said modified waves will be reflected in a pattern corresponding to the structure of said object, a mosaic adapted to be arranged in the path of said reflected waves and comprising a multiplicity of vibratile elements each capable of translating reflected waves which impinge thereon into an electrical wave corresponding to the position and intensity of the compressional waves in said reflected wave pattern, means focussing said reflected pattern on said mosaic means for transmitting said electrical waves out of said water, and means responsive to the impress thereon of said discrete electrical waves for converting said electrical waves into an optical image corresponding to the intensity and relative position of the compressional waves in said reflected wave pattern.

2. The invention as set forth in claim 4 and wherein said vibratile elements comprise piezoelectric crystals.

3. The invention as set forth in claim 4 and wherein said means for converting said discrete electrical signals into an optical image comprises a cathode ray Kinescope.

4. Apparatus for producing an optical image of an obfuscated object, said apparatus comprising means for projecting compressional waves in the sonic or ultrasonic range of a frequency capable of penetrating the obfuscating medium onto said object whereby said waves will be modified and reflected in a pattern corresponding to the structure of said object, a mosaic comprising a multiplicity of vibratile elements for picking up at least some of said reflected modified compressional waves and converting said picked-up waves into a multiplicity of discrete electrical signals corresponding to their position of reflection from said object, means focussing said reflected-up waves on said mosaic and means for converting said discrete electrical signals into an optical image of said object.

5. Apparatus for producing an optical image of an obfuscated object, said apparatus comprising means for projecting compressional waves of a frequency capable of penetrating the obfuscating medium onto said object whereby said waves will be modified and reflected in a pattern corresponding to the structure of said object, a mosaic comprising a multiplicity of magnetostrictive tubes for picking up at least some of said reflected modified compressional waves and converting said picked-up waves into a multiplicity of discrete electrical signals corresponding to their position of reflection from said object, and means for converting said discrete electrical signals into an optical image of said object.

6. Apparatus for producing an optical image of an obfuscated object, said apparatus comprising means for projecting compressional waves of a frequency capable of penetrating the obfuscating medium onto said object whereby said waves will be modified and reflected in a pattern corresponding to the structure of said object, a mosaic comprising a multiplicity of capacitive type microphones for picking up at least some of said reflected modified compressional waves and converting said picked-up waves into a multiplicity of discrete electrical signals corresponding to their position of reflection from said object, and means for converting said discrete electrical signals into an optical image of said object.

GLENN L. DIMMICK.

REFERENCES CITED

The following references are of record in the file of this patent:

UNITED STATES PATENTS

| Number | Name | Date |
| --- | --- | --- |
| 1,699,270 | Baird | Jan. 15, 1929 |
| 1,907,124 | Reiben | May 2, 1933 |
| 2,031,884 | Gray | Feb. 25, 1936 |
| 2,083,292 | Cawley | June 8, 1937 |
| 2,121,771 | Jones | June 21, 1938 |
| 2,143,035 | Smith | Jan. 10, 1939 |
| 2,215,365 | Vestergren | Sept. 17, 1940 |
| 2,400,552 | Hoover | May 21, 1946 |
| 2,408,028 | Batchelder | Sept. 24, 1946 |
| 2,411,071 | Wade | Nov. 12, 1946 |
| 2,411,146 | Clement | Nov. 19, 1946 |
| 2,418,846 | Meacham | Apr. 15, 1947 |

FOREIGN PATENTS

| Number | Country | Date |
| --- | --- | --- |
| 315,362 | Great Britain | Feb. 12, 1931 |
| 541,959 | Great Britain | Dec. 19, 1941 |
| 863,792 | France | Apr. 9, 1941 |